United States Patent
Park

(10) Patent No.: US 9,079,547 B2
(45) Date of Patent: Jul. 14, 2015

(54) MOUNTING STRUCTURE OF WOOFER FOR VEHICLE

(75) Inventor: Jun-Gyoo Park, Yongin-shi (KR)

(73) Assignee: KIA MOTORS CORPORATION, Seoul (KR)

( * ) Notice: Subject to any disclaimer, the term of this patent is extended or adjusted under 35 U.S.C. 154(b) by 299 days.

(21) Appl. No.: 13/619,153

(22) Filed: Sep. 14, 2012

(65) Prior Publication Data

US 2013/0161452 A1 Jun. 27, 2013

(30) Foreign Application Priority Data

Dec. 22, 2011 (KR) .................. 10-2011-0140150

(51) Int. Cl.
*H04R 1/02* (2006.01)
*B60R 11/02* (2006.01)
*B60R 11/00* (2006.01)

(52) U.S. Cl.
CPC ..... *B60R 11/0217* (2013.01); *B60R 2011/0024* (2013.01)

(58) Field of Classification Search
CPC ............ B60R 11/00; B60R 2011/0003; B60R 2011/0019; B60R 2011/0021; H04R 1/02
USPC ............... 248/27.1, 27.3, 231.9, 343, 320; 296/193.08, 287.05, 193.02, 146.6, 296/187.11, 186.3; 381/389, 391, 386, 86
See application file for complete search history.

(56) References Cited

U.S. PATENT DOCUMENTS

| 5,273,243 | A | * | 12/1993 | Abdallah et al. | ............. 248/27.1 |
| 5,414,229 | A | * | 5/1995 | Rocheleau et al. | ........... 181/150 |
| 6,758,451 | B2 | * | 7/2004 | Rivera et al. | ............... 248/231.9 |
| 7,177,438 | B2 | * | 2/2007 | Iwaya et al. | .................. 381/389 |
| 7,410,208 | B2 | * | 8/2008 | Kim et al. | ................. 296/193.08 |
| 8,113,472 | B2 | * | 2/2012 | Wippler et al. | ............... 248/27.1 |
| 8,131,004 | B2 | * | 3/2012 | Horigome et al. | ............ 381/409 |
| 2004/0247150 | A1 | * | 12/2004 | Iwaya et al. | .................. 381/389 |
| 2007/0075568 | A1 | * | 4/2007 | Kim et al. | ................. 296/193.08 |
| 2009/0008511 | A1 | * | 1/2009 | Wippler et al. | ............... 248/27.1 |
| 2009/0033120 | A1 | | 2/2009 | Sakai et al. | |
| 2011/0116658 | A1 | | 5/2011 | Mimura et al. | |

FOREIGN PATENT DOCUMENTS

JP 2010-125916 6/2010
KR 1020050101964 A 10/2005

* cited by examiner

*Primary Examiner* — Nkeisha Smith
(74) *Attorney, Agent, or Firm* — Morgan, Lewis & Bockius LLP

(57) ABSTRACT

A mounting structure of a woofer for a vehicle may include a reinforcement member combined with a panel and having a flat base surface and a stepped base surface, a first bending member disposed between the flat base surface and the stepped base surface, and the panel formed of an upper part and a lower part, a second bending member being formed between the upper part and the lower part, wherein the reinforcement member may be combined with the panel in a way that the flat base surface of the reinforcement member may be in contact with the upper part of the panel and the stepped base surface of the reinforcement member may be in contact with the lower part of the panel, and wherein the first bending member and the second bending member may be spaced apart to form a space therebetween.

10 Claims, 4 Drawing Sheets

< Top-side view >

< Bottom-side view >

US 9,079,547 B2

MOUNTING STRUCTURE OF WOOFER FOR VEHICLE

CROSS-REFERENCE TO RELATED APPLICATION

The present application claims priority to Korean Patent Application No. 10-2011-0140150, filed on Dec. 22, 2011, the entire contents of which is incorporated herein for all purposes by this reference.

BACKGROUND OF THE INVENTION

1. Field of the Invention

The present invention relates to a mounting structure of a woofer for a vehicle, and more particularly, to a mounting structure of a woofer for a vehicle, in which a reinforcement member is installed to suppress the rattle noise caused by the vibrations generated in a woofer.

2. Description of Related Art

Inside a vehicle is installed a woofer, in which the low note is reinforced, and as the interior of a woofer is becoming luxurious, a woofer's output and performance are being improved.

The woofer is installed in the rear side of a vehicle so that the sound would spread out all over the inside of a vehicle. In other words, commonly the woofer is installed on a tray panel which divides the inside of the vehicle into the interior and the trunk.

With reference to FIG. 1, the woofer is installed in the mount hole formed in the center of a tray panel so that its top portion is exposed. Also, in order to prevent the vibrations from being conveyed to the car frame when a woofer is operating, a mass damper, which has a fixed mass on both ends, is installed, and a reinforcement member is installed along the border of the mount hole of the tray panel to reinforce rigidity.

The reinforcement member is ring-shaped, and the internal side of its border is curved upward so as to increase the bending rigidity.

However, a mounting structure of a woofer for a vehicle having the composition described above had the problem of the low insulation effect against the vibrations as the power of a woofer increases.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a mounting structure of a woofer for a vehicle, which can improve rigidity at the installation point of a woofer, in order to prevent the vibrations from being conveyed to the car frame.

The technical problems that the present invention is set out to solve are not limited to the ones mentioned above, and those that are not mentioned shall be clearly understood by a person skilled in the art from looking at the specification of the present invention.

In an aspect of the present invention, a mounting structure of a woofer for a vehicle, which may have a circular border member fixed on one side of the panel where a mount hole is formed, may include a reinforcement member, which is combined with the other side of the panel so as to support the border member of the woofer on the panel, wherein a first bending member, which is ring-shaped and on which a center hole is formed, is arranged so that a stair gap is formed along a border of the first bending member, and wherein a second bending member is formed on the panel so that a stair gap is formed on the panel and the reinforcement member is combined with the panel in a way that an upper surface of the reinforcement member is in contact with the panel but the first bending member and the second bending member are spaced apart to form a space between the first and second bending members.

On the reinforcement member, a convex-shaped bead is formed on an opposite side of where the stair gap formed by the first bending member exists.

The bead may include at least two beads, which are formed radially from the center hole and spaced apart in a circumferential direction of the reinforcement member.

On an outer circumference of the reinforcement member is formed a first reinforcement member bent upwards from the reinforcement member.

On an inner circumference of the panel is formed a second reinforcement member bent upwards from the panel.

In another aspect of the present invention, a mounting structure of a woofer for a vehicle, which may have a circular border member fixed on a side surface of a panel to which a mount hole is formed, may include a reinforcement member ring-shaped and combined with the other side surface of the panel and having a center hole formed in the center thereof, a flat base surface and a stepped base surface disposed lower than the flat base surface, a first bending member disposed between the flat base surface and the stepped base surface, and the panel formed of an upper part and a lower part disposed lower than the upper part, a second bending member being formed between the upper part and the lower part, wherein the reinforcement member is combined with the panel in a way that the flat base surface of the reinforcement member is in contact with the upper part of the panel and the stepped base surface of the reinforcement member is in contact with the lower part of the panel, and wherein the first bending member and the second bending member are spaced apart to form a space therebetween.

A convex-shaped bead is formed to protrude upwards from the reinforcement member.

The bead may include at least two beads, which are formed radially from the center hole of the reinforcement member and spaced apart in a circumferential direction of the reinforcement member.

On an outer circumference of the reinforcement member is formed a first reinforcement member bent upwards from the flat base surface of the reinforcement member.

On an inner circumference of the panel is formed a second reinforcement member bent upwards from the lower part of the panel.

The stepped base surface of the reinforcement member is disposed between the second reinforcement member and the second bending member of the panel.

A space is formed between the contact surfaces so as to increase rigidity at the installation point of a woofer in the present invention having the composition described above, and these results in deletion of a mass damper.

This causes the weight to drop and a panel can be formed more thinly, so the producing cost and the vehicle's fuel efficiency can be improved.

Furthermore, a bead protrudes in the opposite direction upward direction in the embodiment of the present invention of where a stair gap is formed downward direction in the embodiment of the present invention on the reinforcement member so a mounting structure of a woofer can be even more reinforced.

In addition, on each end of a reinforcement member and a panel, a first reinforcement member and a second reinforcement member are formed respectively, and this can improve the rigidity even further.

In other words, a mounting structure of a woofer according to the present invention is improved in terms of the dynamic stiffness and the static stiffness so it can more efficiently control the rattle noise.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
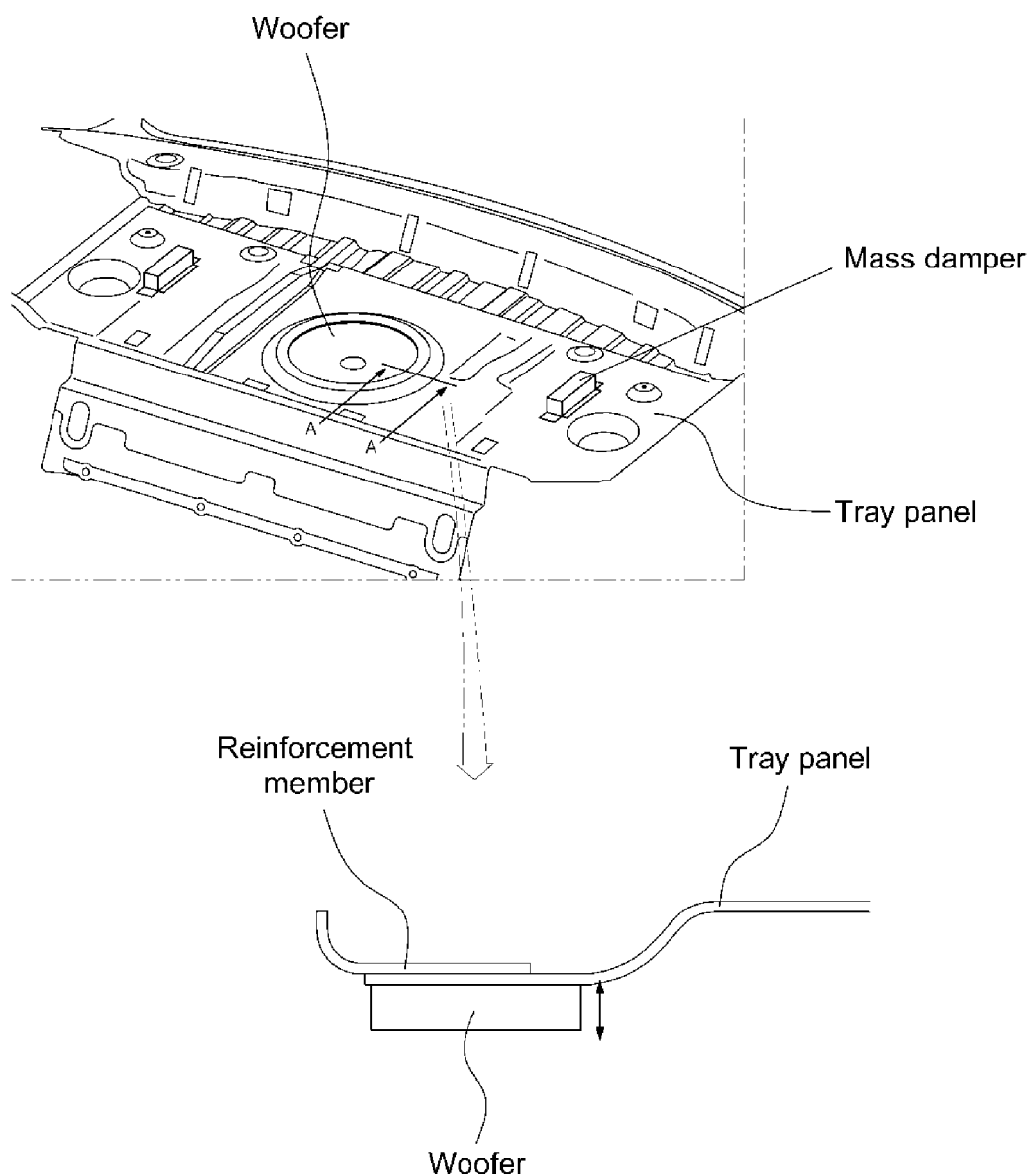
FIG. 1 is a perspective view illustrating a woofer being installed in the traditional method and a cross sectional view of the A-A portion.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereafter, with reference to the attached drawings, the exemplary embodiment of the present invention will be described in detail. Before proceeding, it should be noted that the terminologies and words used on this specification and in the claims are not to be interpreted solely as the general or dictionary meanings, and they should be interpreted as the meanings and the concept which correspond with the technological ideas of the present invention based on the principle that the inventor can properly define the concept of the terminologies in order to explain his own invention in the best possible way. Therefore, the compositions described in the exemplary embodiments and the drawings of this specification are merely the most preferred types of embodiment and they do not represent the entire technological ideas of the present invention, and thus, it should be understood that there can be a variety of equivalents and alterations, which can replace these embodiments at the time of filing this application.

According to FIG. 2, on a panel 20 (including a panel such as a tray panel on which a woofer is installed, as described above) is formed a mount hole 21 with a fixed diameter, and inside of a vehicle above the panel as illustrated in the drawings is installed a reinforcement member 10 and on the opposite side (below the panel) is installed a woofer 30 so that the center is exposed. The woofer 30 is cone-shaped (as a general woofer is), and a circular border member 31 is formed on its end so that it is pressed to a panel 20 and connected to the panel by bolting.

Figure 3:
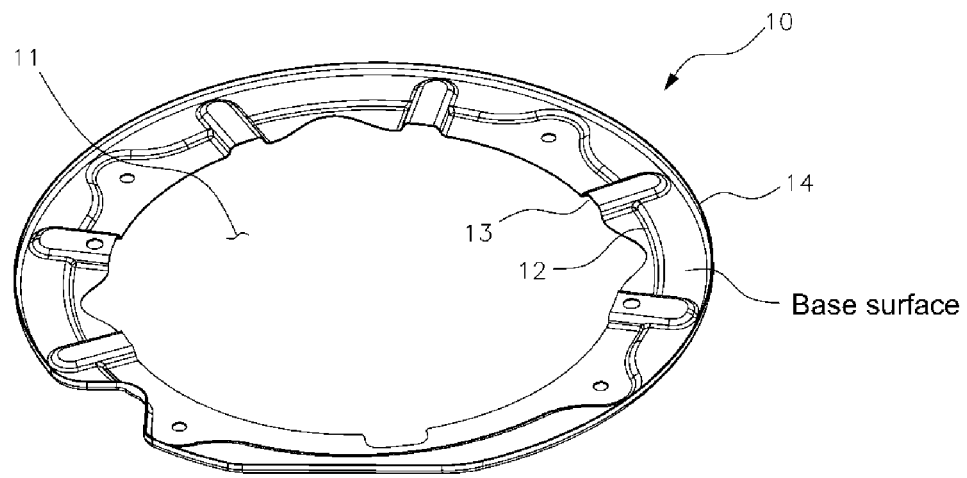
FIG. 3 shows two perspective views respectively illustrating the upper side and the bottom side of the reinforcement member according to an exemplary embodiment of the present invention.
Figure 3:
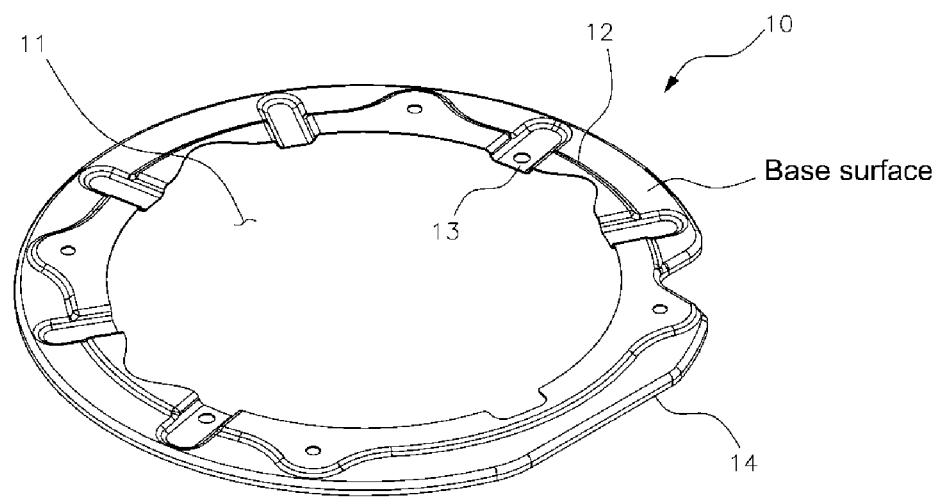

As illustrated in FIG. 3, a center hole 11 is formed in the center of the reinforcement member 10, which is ring-shaped and is large enough to support a border member 31 of a woofer 30, and a first bending member 12 is formed between the flat base surface 40 and a stepped base surface 50 along its circumference so that a stair gap is formed towards between the flat base surface 40 and the stepped base surface 50. As a first bending member 12 is formed, the stepped base surface 50, which is closer to a center hole 11, i.e., the inner border of a center hole 11 is formed as to protrude downward compared to the flat base surface 40.

Also, from the flat base surface 40, a multitude of beads are formed as to protrude upward in other words, the opposite direction of where the stair gap is formed towards by the first bending member 12. The beads 13 are formed so that they have a convex, bent shaped and they are arranged radially centering the center hole 11 having a fixed distance between each one of them.

Furthermore, on the reinforcement member 10, a multitude of bolt holes are made so that it can be connected by bolting to a border member 31 of a woofer 30 along with a panel 20.

Figure 2:
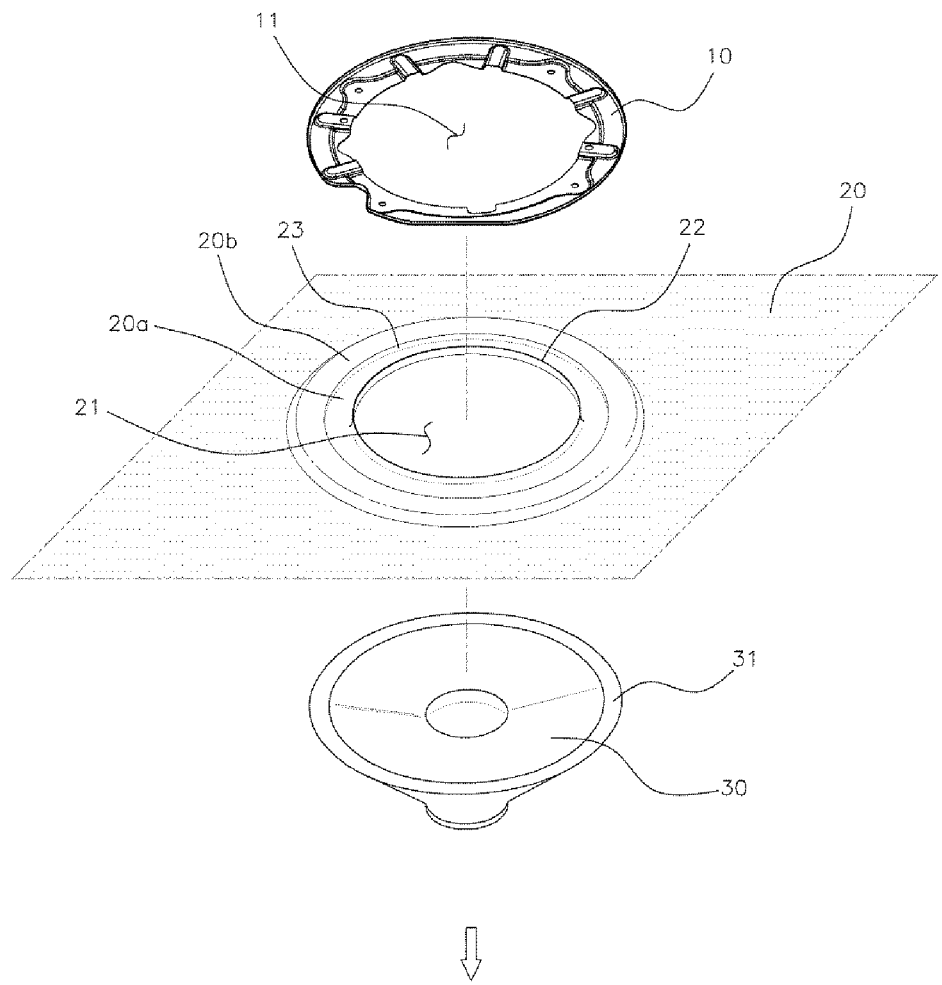
FIG. 2 is an exploded perspective view illustrating a woofer and a reinforcement member being installed in a panel and a top view illustrating a woofer and a reinforcement member installed in a panel according to an exemplary embodiment of the present invention.
Figure 2:
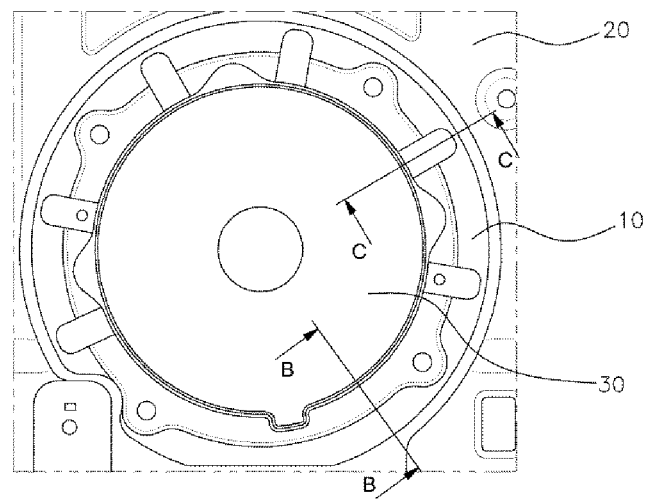
Figure 4:
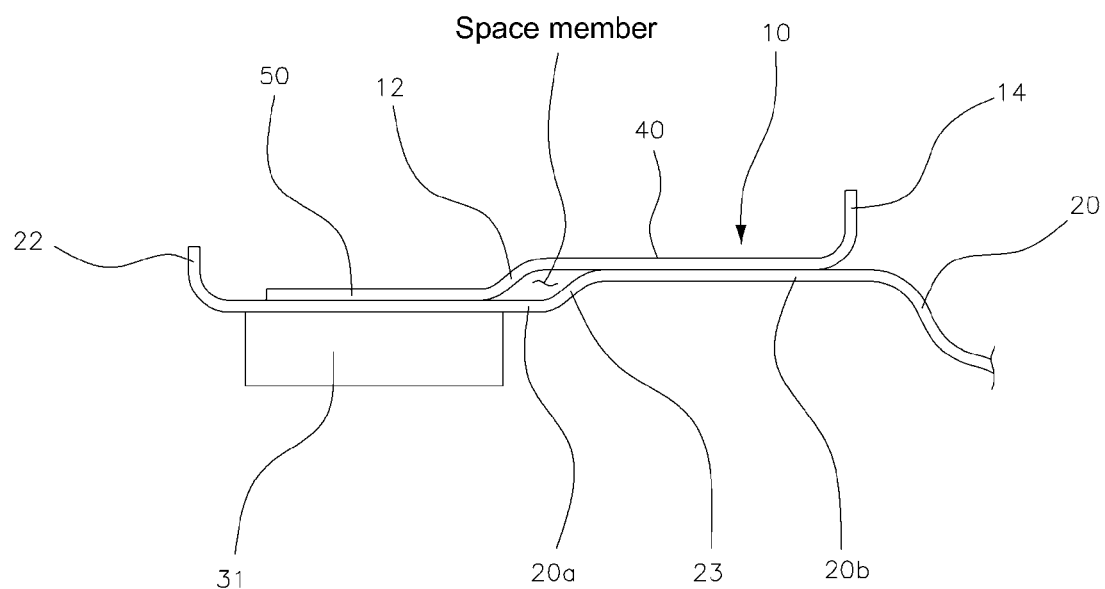
FIG. 4 is a cross sectional view of the B-B portion of FIG. 2.
Figure 5:
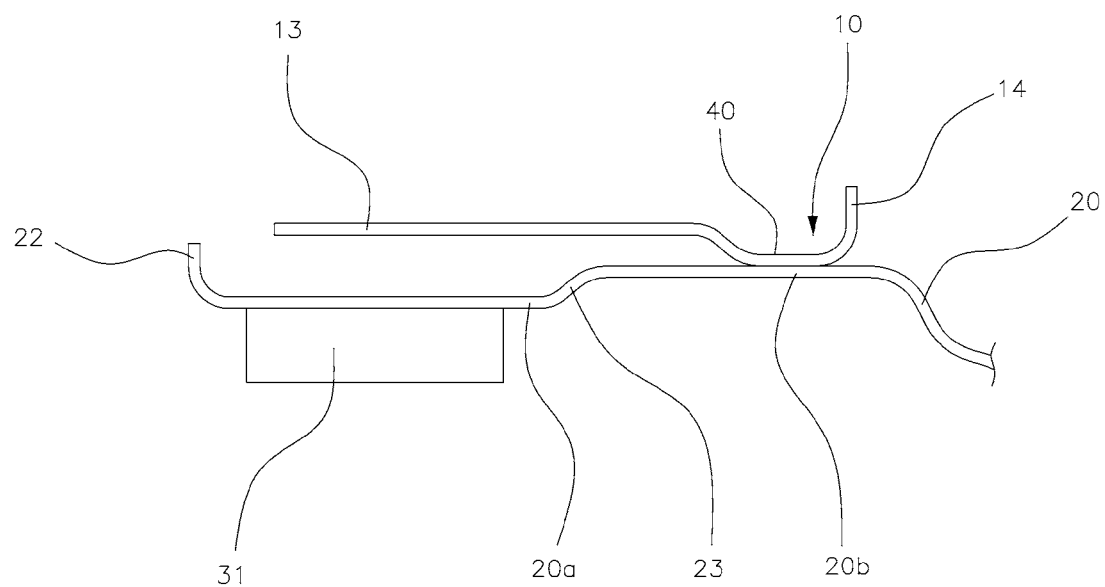
FIG. 5 is a cross sectional view of the C-C portion of FIG. 2.

Meanwhile, in reference to FIGS. 2, 4 and 5, on a panel 20 combined with the reinforcement 10, a mount hole 21 is formed in a way that the center of a woofer 30 is exposed, and a second bending member 23 is formed so that a reinforcement member 10 with the stair gap formed on top of it can be in surface contact with the panel and connected to it. The surface of the panel which is in contact with a reinforcement member 10 by the second bending member 23 is divided into two parts of a lower part 20a and an upper part 20b.

Also, as illustrated in FIG. 4, the first bending member 12 and a second bending member 23 are arranged so that a fixed space is formed in between them. The space has a bent shaped on its both sides, and therefore, it can improve bending rigidity at the combination point of a woofer 30.

Furthermore, a border member 31 of a woofer 30 is combined with a lower part 20a of the contact surface of a panel 20, but, in order to insulate the vibrations conveyed from a border member 31, the inner border of a panel 20 is bent upward to form a second reinforcement member 22 and the outer border of a reinforcement member 10 is bent along the circumference (so as to be parted from the panel) to form a first reinforcement member 14.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A mounting structure of a woofer for a vehicle, the structure comprising;
    the woofer having a circular border member fixed on one side of a panel where a mount hole is formed; and
    a reinforcement member, which is combined with another side of the panel so as to support the border member of the woofer on the panel,
    wherein a first bending member, which is formed on the reinforcement member, is ring-shaped and on which a center hole is formed, is arranged so that a stair gap is formed along a border of the first bending member,
    wherein a second bending member is formed on the panel so that a stair gap is formed on the panel and the reinforcement member is combined with the panel in a way that an upper surface of the reinforcement member is in contact with the panel but the first bending member and the second bending member are spaced apart to form a space between the first and second bending members, and
    wherein, on the reinforcement member, a convex-shaped bead is formed on an opposite side of where the stair gap formed by the first bending member exists.

2. The structure according to claim 1, wherein the bead includes at least two beads, which are formed radially from the center hole and spaced apart in a circumferential direction of the reinforcement member.

3. The structure according to claim 1, wherein on an outer circumference of the reinforcement member is formed a first reinforcement member bent upwards from the reinforcement member.

4. The structure according to claim 1, wherein on an inner circumference of the panel is formed a second reinforcement member bent upwards from the panel.

5. A mounting structure of a woofer for a vehicle, the structure comprising;
    the woofer having a circular border member fixed on a side surface of a panel to which a mount hole is formed;
    a reinforcement member ring-shaped and combined with another side surface of the panel and having:
        a center hole formed in a center thereof;
        a flat base surface and a stepped base surface disposed lower than the flat base surface;
        a first bending member disposed on the reinforcement member between the flat base surface and the stepped base surface; and
    the panel formed of an upper part and a lower part disposed lower than the upper part, a second bending member being formed between the upper part and the lower part,
    wherein the reinforcement member is combined with the panel in a way that the flat base surface of the reinforcement member is in contact with the upper part of the panel and the stepped base surface of the reinforcement member is in contact with the lower part of the panel, and
    wherein the first bending member and the second bending member are spaced apart to form a space therebetween.

6. The structure according to claim 5, wherein a convex-shaped bead is formed to protrude upwards from the reinforcement member.

7. The structure according to claim 6, wherein the bead includes at least two beads, which are formed radially from the center hole of the reinforcement member and spaced apart in a circumferential direction of the reinforcement member.

8. The structure according to claim 5, wherein on an outer circumference of the reinforcement member is formed a first reinforcement member bent upwards from the flat base surface of the reinforcement member.

9. The structure according to claim 5, wherein on an inner circumference of the panel is formed a second reinforcement member bent upwards from the lower part of the panel.

10. The structure according to claim 5, wherein the stepped base surface of the reinforcement member is disposed between the second reinforcement member and the second bending member of the panel.

* * * * *